M. LEITCH.
MILKING MACHINE.
APPLICATION FILED OCT. 19, 1915.

1,195,999.

Patented Aug. 29, 1916.

WITNESS:

INVENTOR
Meredith Leitch
BY
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE.

1,195,999.     Specification of Letters Patent.     Patented Aug. 29, 1916.

Application filed October 19, 1915. Serial No. 56,661.

*To all whom it may concern:*

Be it known that I, MEREDITH LEITCH, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

The invention relates to that type of milking machines in which a partial vacuum is employed to draw the milk from the cow, while at the same time the teat is subjected to manipulation by alternately applying and releasing external pressure. This mode of operation, in its preferred application, involves the employment of a two-chambered teat cup, the inner or teat-receiving chamber of which is in communication with the milk pail, which is under a partial vacuum, while the pressure in the outer chamber is intermittently varied, preferably alternating between atmospheric pressure and a partial vacuum which may equal or exceed the degree of vacuum in the inner teat cup chamber.

The systems by which the above type of milking machines are ordinarily operated may be classified as follows: In the first class, a pipe line is provided in which a substantially uniform partial vacuum is maintained, and an automatic pulsator (that is, a valve which is moved automatically by some form of vacuum motor), by alternate connections to the vacuum pipe and the atmosphere, causes pulsations which, with a proper designed teat cup, will manipulate the teat as desired. In another class, a similar substantially uniform vacuum is maintained in the pipe line, and at each stanchion a valve is operated, by a rod, wire or other mechanical means, to connect the pipe connections to the pulsation chamber of the teat cup alternately with the vacuum pipe and with the atmosphere. In a third class there is provided a vacuum pipe and another pipe for conveying pulsations from a conveniently located master valve to a secondary valve near the milking machine. A fourth class differs from the third in that the secondary valve is operated electrically from a master switch. These systems are all objectionable by reason either of expense of installation or complication in operation, or both.

The object of my invention is to cheapen the installation and simplify the operation and at the same time provide mechanism of maximum efficiency.

A preferred embodiment of the invention is shown in the accompanying drawings, in which—

Figure 1:
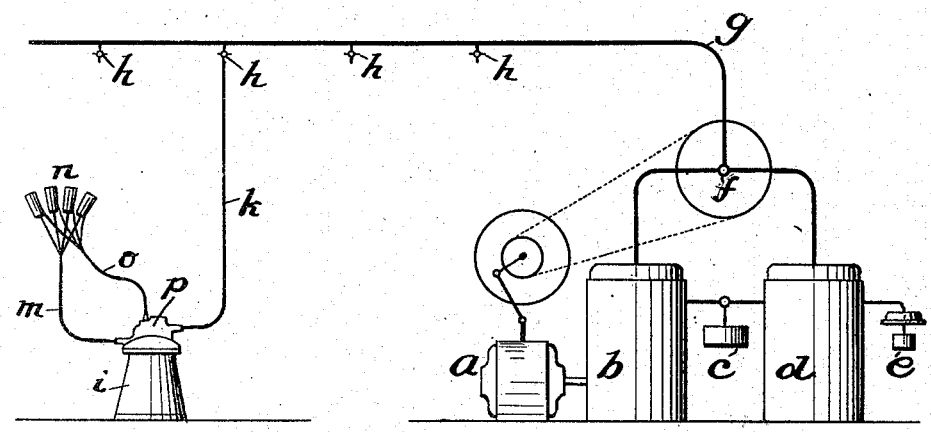
Figure 2:
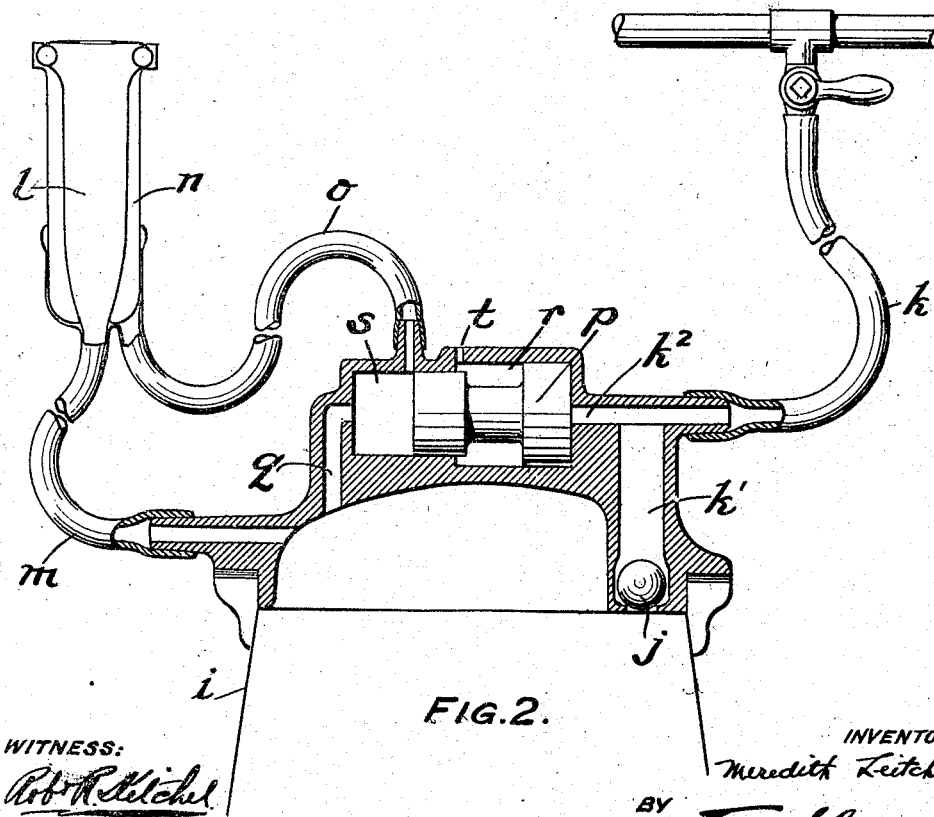

Figure 1 is a diagrammatic view of an apparatus embodying my invention. Fig. 2 is a detailed view, in sectional elevation, of the pulsator valve and the milk pail and the connections therefrom to one of the teat cups and the main pipe line.

A vacuum pump $a$ exhausts air from a high vacuum tank $b$, which is connected with a low vacuum tank $d$ through a pipe controlled by an automatic pressure-reducing valve $c$ adapted to permit air to flow from the low vacuum tank $d$ to the high vaccum tank $b$ when the difference in pressure is greater than is desired. An automatic vacuum relief valve admits air to the low vacuum tank $d$ when the vacuum therein becomes higher than is desired.

A valve $f$, that may be operated from the same motor $x$ that drives the vacuum pump $a$, connects a stanchion pipe line $g$ with the tanks $b$ and $d$ alternately.

The stanchion pipe line $g$ is provided, at convenient points, with cocks $h$ for the attachment of a flexible pipe $k$. A casting, which may be conveniently mounted on the lid of the milk pail $i$, has communicating passages $k'$ and $k^2$, the latter having a nozzle to which the pipe $k$ is connected. Pipe $k^2$ connects with a teat-cup controlling valve (hereinafter described) and pipe $k'$, through a check valve $j$, connects with the milk pail $i$. The check valve $j$ allows air to flow from the pail toward the pipe line but prevents its return toward the pail and thus causes the constant vacuum in the pail to approximate the higher vacuum intermittently in the pipe line.

The teat cup is of the two chambered type, the inner or teat-receiving chamber $l$ communicating by a tube $m$ with the milk pail, and the outer or pulsation chamber $n$ (separated from the inner chamber $l$ by a flexible wall) communicating by a tube $o$ with the valve by which it is controlled. This valve comprises a cylinder of two diameters and a differential piston $p$. The tube $o$ connects with the small diameter cylinder $s$ through a port between its ends. The end of the small diameter cylinder $s$ is constantly in communication by a passage $q$ with the pail $i$. The end of the large diameter cylinder $r$ is connected with the branch $k^2$ of the pipe $k$. The differential space is open to the atmosphere at $t$.

In operation, the pump $a$ exhausts air from the high vacuum tank $b$, and, through the pressure-reducing valve $c$, from the low vacuum tank $d$, the valve $c$ allowing air to pass from tank $d$ to tank $b$ only when the difference in vacuum exceeds the difference desired. The vacuum relief valve $e$ prevents the attainment of too high a vacuum in the tank $d$. The mechanically operated valve $f$ connects the stanchion pipe line $g$ with the tanks $b$ and $d$ alternately, thus causing a wave vacuum in the pipe line. When the tube $k$ is connected to a cock $h$ and the cock opened, the waves are transmitted, through the branch $k^2$, to the large diameter cylinder $r$ of the teat cup controlling valve and, through the branch $k'$, to the milk pail. After sufficient air is exhausted from the pail to cause the vacuum therein to drop below the low vacuum in tank $d$, the check valve closes at each low vacuum wave, and the vacuum in the pail speedily approximates the high vacuum in tank $b$ and remains there during the milking operation. Because of the connection through the tube $q$, the vacuum in the cylinder $s$ is the same as that in the pail.

During the high vacuum wave, the pressure against the large end of the piston $p$ is the same as that against the small end thereof, but atmospheric pressure on the differential area moves the piston to the right. During the low vacuum wave, the pressure against the large end of the piston overcomes the lower pressure against the small end thereof and the atmospheric pressure against the differential area and forces the piston to the left. By these movements, the piston $p$ connects the pulsation chamber of the teat cup alternately with the atmosphere and with a vacuum subsantially equal to that in the inner teat cup chamber, thereby causing the flexible wall between said chambers to move inward and outward, thus manipulating the teat, while simultaneously the inner teat cup chamber is constantly under suction.

In practice it has been found that a maximum vacuum corresponding to 14 or 15 inches of mercury with a lower vacuum corresponding to 10 or 11 inches of mercury is perhaps the most efficient, but other values may be used if desired.

For convenience I have shown but one teat cup, it being within the skill of the mechanic to provide connections from the teat cups to the pail and to the control valve.

While I have shown, and prefer to use, two separate tanks, one high vacuum and the other low vacuum, connecting with a control valve to produce vacuum waves in the pipe line, it will be understood that other means may be provided although less advantageously, to produce the same result, and unless specifically claimed, the invention is not limited to such tanks. It will be understood that where different degrees of vacuum are specified in the claims, it is not intended to include, as an equivalent thereof, the production in the pipe line of that type of "vacuum pulsations" in which a partial vacuum alternates with a pressure at or above that of the atmosphere, as in my applications, Serial Nos. 8455, 8456, 8457 and 8458, filed February 16, 1915, and Serial No. 9500, filed February 20, 1915; the control of the milking operation by what I call "vacuum waves," as herein described, having a pronounced advantage. It will also be understood that where the two vacuum tanks are specifically claimed, the invention is not limited the means shown for maintaining the different degrees of vacuum therein, except where specifically claimed, although the connection of the two tanks through a pressure reducing valve and the connection of one, the high vacuum tank, with the pump are desirable features, while the provision of a relief valve on the low degree vacuum tank only is of pronounced advantage in that it insures the continuous maintenance of a lower vacuum in the tank $d$ than in the tank $n$, which is necessary to insure proper operation. Nor is the invention limited to the specific construction of teat-cup controlling-valve shown, it being understood, however, that the invention permits the employment of a valve of maximum simplicity of construction, which is of decided advantage. The employment of a single main pipe is also of material advantage in respect to cheapness of installation. While I have shown the inner teat cup chamber as both constantly in communication with a source of suction, and also as actually under a continuous and constant suction, so that the suction on the teat is unrelieved except for the intermittent pressure in the pulsation chamber, it is not intended, except where specifically claimed, to exclude the intermittent cutting off of suction from the inner teat cup chamber nor the intermittent admission of air to the milk pipe, as is known in the art; although in a machine constructed in accordance with my invention, such mode of operation is not only unnecessary, but is, on the whole, inadvisable.

Having now fully described my inven- tion, what I claim and desire to protect by Letters Patent is:

1. In a milking machine, in combination, a double chambered teat cup, a milk pail connected with the inner chamber of the teat cup, and means to maintain a partial vacuum in the milk pail and to create pneumatic pulsations in the outer teat cup chamber, said means including a pipe line and pneumatic mechanism to produce therein alternately a high degree and a low degree of vacuum.

2. In a milking machine, in combination, a double chamber teat cup, a pipe line, means to produce therein alternately a relatively high and a relatively low partial vacuum, and a valve controllable by the vacuum waves in the pipe line and connected with the outer chamber of the teat cup and adapted to produce therein pneumatic pulsations.

3. In a milking machine, in combination, a double chambered teat cup, a pipe line, means to produce therein alternately a relatively high and a relatively low partial vacuum, and a valve controllable by the vacuum waves in the pipe line and adapted to connect the outer chamber of the teat cup alternately with the atmosphere and a partial vacuum.

4. In a milking machine, in combination, a milk pail, a double chambered teat cup, a pipe line, means to produce therein alternately a relatively high and a relatively low partial vacuum, and means controllable by the vacuum waves in the pipe line to maintain a partial vacuum in the milk pail and to create pneumatic pulsations in the outer teat cup chamber.

5. In a milking machine, in combination, a milk pail, a double chambered teat cup, a pipe line, means to produce therein alternately a relatively high and a relatively low partial vacuum, and means controllable by the vacuum waves in the pipe line to maintain a relatively high partial vacuum in the milk pail and to connect the outer chamber of the teat cup alternately with atmosphere and with said relatively high partial vacuum.

6. In a milking machine, in combination, a milk pail, a double chambered teat cup, a pipe line, means to produce therein alternately a relatively high and a relatively low partial vacuum, a non-return valve between the milk pail and the pipe line whereby the degree of vacuum in the pail tends to approximate the relatively high partial vacuum in the pipe line, and means controllable by the vacuum waves in the pipe line and connected with the outer chamber of the teat cup and adapted to produce therein pneumatic pulsations.

7. In a milking machine, in combination, a milk pail, a double chambered teat cup, a pipe line, means to produce therein alternately a relatively high and a relatively low partial vacuum, a non-return valve between the milk pail and the pipe line whereby the degree of vacuum in the pail tends to approximate the relatively high partial vacuum in the pipe line, and a valve controllable by the vacuum waves in the pipe line and connected with the outer chamber of the teat cup and adapted to connect the same alternately with the atmosphere and with a partial vacuum.

8. In a milking machine, in combination, a milk pail, a double chambered teat cup, a pipe line, means to produce therein alternately a relatively high and a relatively low partial vacuum, a non-return valve between the milk pail and the pipe line whereby the degree of vacuum in the pail tends to approximate the relatively high partial vacuum in the pipe line, a milk pipe connecting the inner teat cup chamber with the pail, a passage communicating with the pail, an air pipe connected with the outer teat cup chamber, and a valve connected with and controllable by the vacuum waves in the pipe line and adapted to connect the air pipe alternately with said passage and with the atmosphere.

9. An operating outfit for milking machines comprising a pipe line, a vacuum pump, a high vacuum tank connected with the vacuum pump, a low vacuum tank, a connection between the two tanks including a reducing valve, a vacuum relief valve regulating the vacuum in the low vacuum tank, and a valve adapted to connect the pipe line with the two tanks alternately.

10. In a milking machine, in combination, a double chambered teat cup, a milk pail, a pipe line, two tanks, means to maintain in one tank a relatively high vacuum and in the other tank a relatively low vacuum, a valve adapted to connect the pipe line with the two tanks alternately, and means controllable by the vacuum waves thus produced in the pipe line to maintain a partial vacuum in the milk pail and to create pneumatic pulsations in the outer teat cup chamber.

11. An operating outfit for milking machines comprising a pipe line, a vacuum pump, a high vacuum tank connected with the vacuum pump, a low vacuum tank, a connection between the two tanks including a reducing valve, a vacuum relief valve regulating the vacuum in the low vacuum tank, a valve adapted to connect the pipe line with the two tanks alternately, the milk pail, a milk pipe connecting the inner teat cup chamber with the pail, a passage communicating with the pail, an air pipe connected with the outer teat cup chamber, a connection between the milk pail and the pipe line including a non-return valve whereby the vacuum in the pail tends to approximate the vacuum in the pipe line, and a valve connected with and controllable by the vacuum waves in the pipe line and adapted to connect the air pipe alternately with said passage and with the atmosphere.

12. In a milking machine, in combination, a double chambered teat cup, a pulsation pipe, means affording communication between the inner teat cup chamber and the pipe and the outer teat cup chamber and the pipe, a non-return valve between the pipe and the inner teat cup chamber adapted to prevent flow of air from the pipe to the inner teat cup chamber, means to produce a relatively high vacuum and a relatively low vacuum, a valve adapted to connect said pipe alternately with the two sources of vacuum, and a valve, controlled in its operation by the variations in the vacuum in said pipe, adapted to intermittently close communication between the pipe and the outer teat cup chamber and admit thereto fluid of a higher density than that in the pipe.

13. In a milking machine, in combination, a double chambered teat cup, a milk discharge connected with the inner teat cup chamber, a valve adapted to control the flow of pressure fluid toward and from the outer teat chamber so as to produce pneumatic pulsations therein, common pulsating means adapted to control said valve and adapted also to place the milk discharge under continuous suction, said pulsating means comprising means to produce a relatively high vacuum and a relatively low vacuum, a pulsator pipe, and a valve to connect said pipe alternately with the two sources of vacuum.

In testimony of which invention, I have hereunto set my hand, at Poughkeepsie, N. Y., on this 14th day of Oct., 1915.

MEREDITH LEITCH.

Witness:
CHARLES L. POWELL.